United States Patent [19]
Snyder

[11] 4,193,064
[45] Mar. 11, 1980

[54] MULTIPLE PULSE TIMER

[76] Inventor: Michael D. Snyder, 4 Fairway Ct., Bridgewater, N.J. 08807

[21] Appl. No.: 940,319

[22] Filed: Sep. 7, 1978

[51] Int. Cl.² .............................................. G08B 7/00
[52] U.S. Cl. ................................ 340/309.4; 340/309.1; 340/384 E; 340/384 R
[58] Field of Search .............. 340/309.4, 309.1, 384 E, 340/384 R; 58/130 E; 84/484

[56] References Cited
U.S. PATENT DOCUMENTS 4,090,355  5/1978  Morohoshi ............... 340/384 E UX

*Primary Examiner*—Harold I. Pitts
*Attorney, Agent, or Firm*—Donald P. Gillette

[57] ABSTRACT

A timer, especially for cardiopulmonary resuscitation, to generate multiple series of pulsating signals to be used by one or more rescuers to time different, but related, operations in reviving a victim whose heart and breathing have just stopped. The pulses of each series are repetitive at different rates, and the first pulse of each series starts after a certain number of pulses of a preceding series has been generated.

11 Claims, 12 Drawing Figures

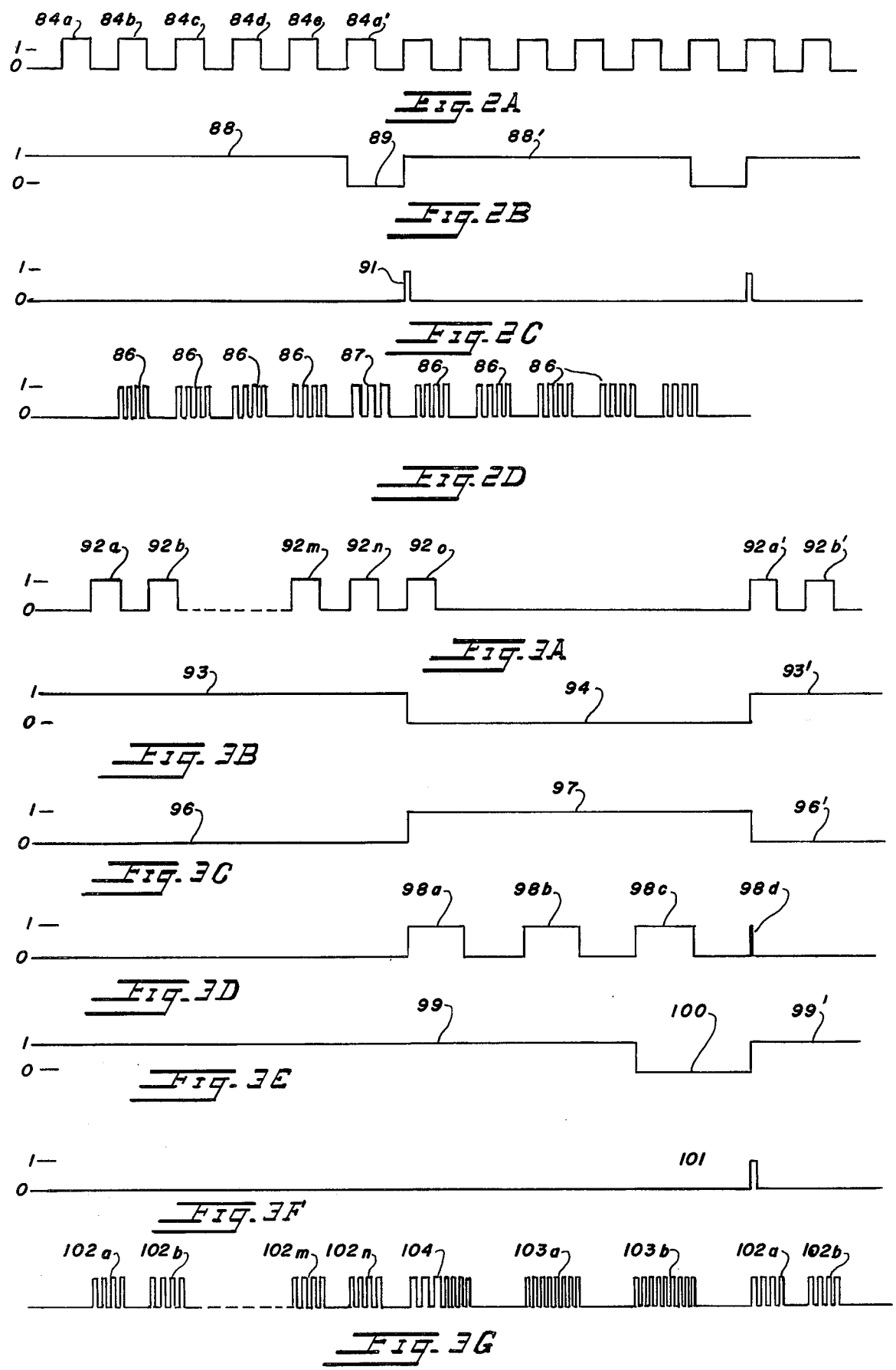

MULTIPLE PULSE TIMER

BACKGROUND OF THE INVENTION

1. Field of the Invention

This invention relates to the field to the field of timers capable of generating multiple series of timing pulses produced in interleaved groups consisting of a certain number of pulses of one series followed by a certain number of pulses of a second series. All of the pulses are used to generate timing signals by which different but related actions of one or more persons using the apparatus can be timed. In particular the invention relates to the field of cardiopulmonary resuscitation (CPR) and, to means for timing the actions of one or two rescuers working to revive a victim of any age from infancy to adulthood.

2. The Prior Art

CPR is the technique of reviving a victim whose heart and lung actions have just stopped, or at least of maintaining flow of oxygenated blood in the victim's cardiovascular system by non-surgical techniques to prevent irreversible brain damage until the victim can be taken to a properly equipped medical facility or until a doctor determines that further efforts are useless.

There are two different but related activities that must be carried out in CPR. One is to apply pressure in impulses, or compressions, to the victim's chest to produce a pumping action that achieves an effect somewhat similar to normal heart operation. The circulation produced by such externally applied pumping depends on the amount of pressure (which must not be excessive) on the victim's chest at each compression and on the number of compressions per minute.

The other activity is to force oxygen into the victim's lungs. This is accomplished by periodically closing the victim's nose and somewhat forcefully exhaling air through the rescuer's mouth directly into the victim's mouth in a prescribed manner. This is called ventilation. While the air thus blown into the victim's lungs includes some carbon dioxide from the rescuer's own lungs, it also includes sufficient oxygen to supply at least the amount necessary to prevent damage to the victim's brain.

There is some difference of opinion as to the exact number of compressions and ventilations per sequence of the two activities and the exact rate at which each should be performed in each sequence, but it is uniformly agreed that infants and small children require more compressions per minute than do adults. Currently, the best opinion is that there should be three different chest compression rates, depending on whether the victim is an adult, a child, or an infant.

If there are two or more rescuers, one can apply compressions at a steady rate sufficient to induce adequate systolic blood pressure in the victim and therefore adequate flow. The other rescuer can apply ventilations without interfering with the compressions. The timing is relatively simple, merely requiring signals at one repetition rate to guide the person applying compressions and detectably different signals at another rate to guide the person giving the lung ventilations.

However, if there is only a single rescuer, it takes a short length of time for the rescuer to move from the proper position for applying chest compressions to an adult or child victim to the position for applying ventilation to such a person. This necessitates applying compressions at a faster rate to achieve a higher systolic blood pressure than in the two rescuer cases so that, when the compressions are momentarily stopped in order to apply ventilation, the blood pressure will not diminish to too low a level.

In the case of an infant, even a single rescuer does not have to change position to go from applying compression to applying ventilation and therefore the compressions need not be interrupted but can continue at a uniform, fairly high rate even while the infant's lungs are being ventilated at a relatively low rate.

Typical rates for compressions are:

| | |
|---|---|
| adult victim, two rescuers | 60/minute |
| adult victim, one rescuer | 80/minute |
| child victim, two rescuers | 80/minute |
| child victim, one rescuer | 100/minute |
| infant victim, one resucer | 120/minute |

One lung ventilation is given synchronously with each fifth compression if there are two rescuers or if the victim is an infant. The sequence for a single rescuer of an adult or child is fifteen compressions at the appropriate rate followed by two ventilations rhythmically given within five seconds. It is easy to forget the correct numbers and even easier to lose count, especially in the case of a single rescuer. it is also easy to apply the compressions unevenly unless automatic timing means are used.

OBJECTS AND SUMMARY OF THE INVENTION

It is one of the objects of this invention to provide means for generating at least two series of pulses having different repetition rates, the pulses of the two series being applied alternately to signaling means in such a way that the first pulse of the second series is applied after a predetermined number of pulses of the first series.

Another object is to provide a small, easily portable timer for CPR and to include a multiposition switch that can be set to a plurality of positions, each corresponding to a standard CPR timing condition.

A further object of the invention is to provide a multiple pulse signaling system including a first pulse generator with means to cause the generator to produce pulses at different predetermined repetition rates, a second pulse generator, means connected to both of the generators to produce timing signals synchronized first by one of the pulse generators and then by the other and physiologically different so that they can be used to time, alternately, two different actions of one or more persons using the apparatus.

In accordance with the present invention first signal generating means are provided to produce pulses at a controllable repetition rate. After a certain number of such pulses have been produced, second pulse generating means included in the apparatus produces pulses at a second repetition rate, and after a certain number of the latter pulses have been produced, circuit means actuated by the second pulse generating means automatically returns the first pulse generating means to operation. Indicating means are provided to produce physiological signals in response to the pulses produced by each of the pulse generating means. These signals are referred to as physiological in the sense that they are detectable by one or more of the physiological senses of persons using the apparatus. For example, the physiological signals may be aural, visible, or tactile and can be used to time chest compressions and lung ventilations applied by one or more rescuers applying CPR to a victim.

One example of such an indicator is an audible signal generator with means for generating audio signals that differ in frequency according to whether the first or second pulse generating means is active. In the case of apparatus used for CPR, the difference in frequency permits one or more rescuers to time chest compressions and lung ventilations properly to obtain the correct repetition rate of compressions, the number of compressions in an uninterrupted sequence, the repetition rate of ventilations, and the number of ventilations in an uninterrupted sequence.

BRIEF DESCRIPTION OF THE DRAWINGS

FIGS. 2A-2D are waveforms representative of the operation of the circuit in FIG. 1 as a CPR timer used by two rescuers. FIGS. 3A-3G are waveform diagrams of the circuit in FIG. 1 used as a CPR timer by one rescuer.

DETAILED DESCRIPTION OF THE INVENTION

Figure 1:
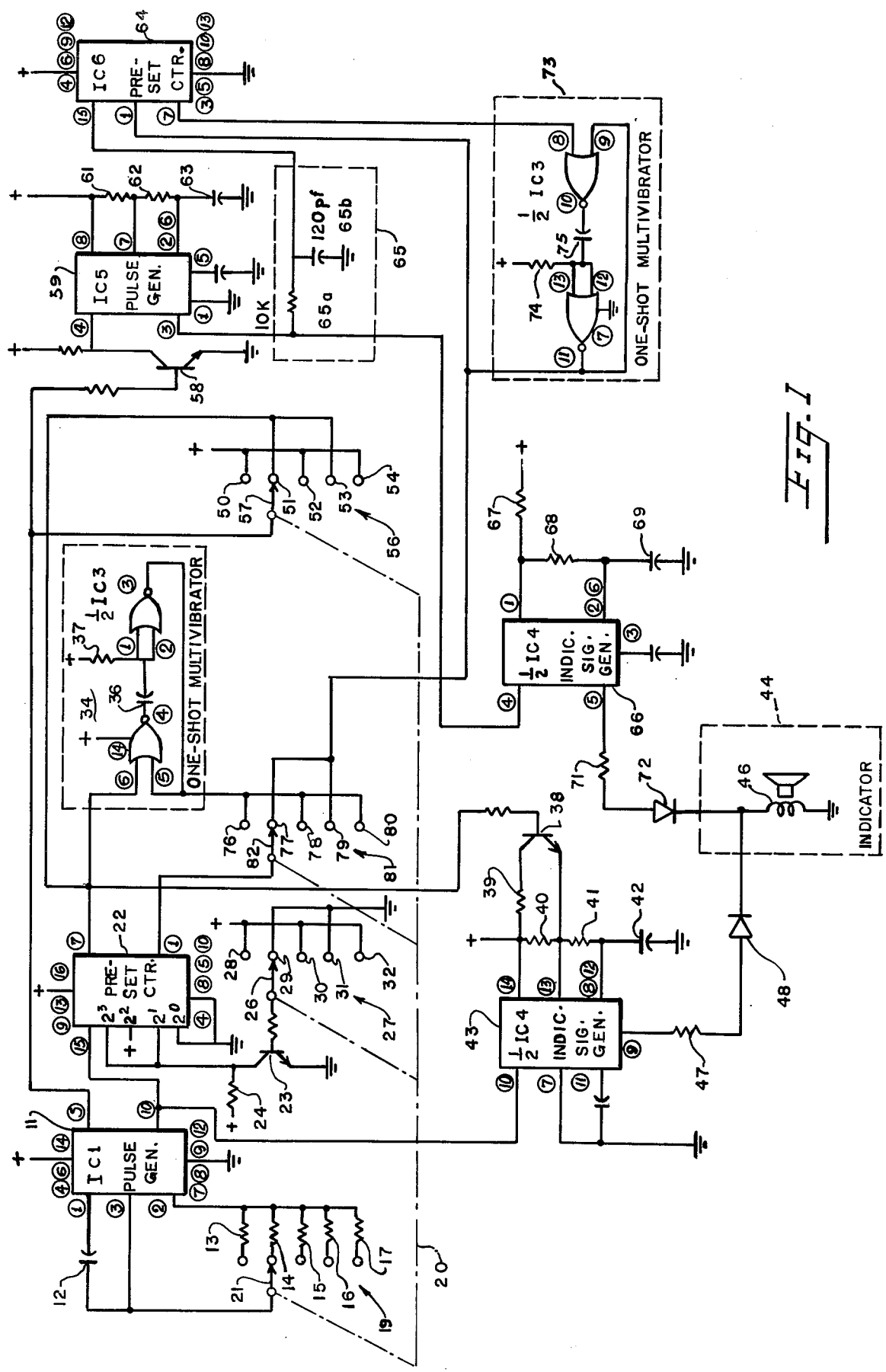
FIG. 1 is a block diagram of a circuit incorporating the invention.

The circuit in FIG. 1 includes a first timing signal generator which, in this embodiment is a pulse generator 11 and is in the form of an integrated circuit indentified as IC1. The repetition rate of pulses produced by the pulse generator 11 is controlled by an RC circuit comprising a capacitor 12 and one of five resistors 13-17. One end of each of these resistors is connected to a separate terminal of a first section 19 of a five position switch 20. The arm 21 of the switch section 19 is connected to the capacitor 12, and the arm and any one of the resistors 13-17 to which it happens to be connected at a given time are connected in series between two terminals that are the frequency-controlling terminals of the particular integrated circuit used as IC1.

The output of the pulse generator 11 is connected to the clock input terminal of a presettable up/down counter 22. In this embodiment, the up/down counter 22 is operated as a binary counter in the down-counting mode, and the specific number of pulses that will be counted before the counting starts over depends on the logic conditions of four count-controlling terminals identified by $2^0$, $2^1$, $2^2$, and $2^3$. For reasons that will be explained later, the counter 22 is expected to count either four counts or fourteen counts in a sequence, and the binary equivalents of four and fourteen are 0100 and 1110, respectively. The particular integrated circuit IC2 chosen for the counter 22 happens to be arranged so that its pin $2^0$ corresponds to the least significant bit, which is 0 for either the binary number 0100 or 1110. The logic of IC2 is such that this requires the pin $2^0$ always to be at ground potential which is equivalent to the logic "0". In a similar manner, the second most significant bit of the two binary numbers 0100 and 1110 is always "1". This requires that the pin $2^2$ of the specific IC2 used in this embodiment be connected to the positive power supply terminal, which the logic level "1". The most significant bit and the third most significant bit will both either be 0 or 1 simultaneously, depending on whether the binary is 0100 or 1110. As a result, both pins $2^1$ and $2^3$ are connected to the collector of an NPN transistor 23. The collector of this transistor is connected to the positive power supply terminal through a resistor 24 and the emitter of the transistor is connected directly to ground. The base of the transistor is connected to the arm 26 of a second section 27 of the five position switch 20. Alternate terminals 28, 30, and 32 of this section are connected to the positive power supply terminal, and the other terminals 29 and 31 of the switch are connected to ground, or the common negative terminal of the power supply.

The carry out, or output, terminal of the presettable counter 22 is connected to the input of a one-shot multivibrator 34, which utilizes one-half of a 4-NOR gate IC3. The duration of the pulse produced by the one-shot 34 is determined by an RC circuit comprising a resistor 35 and a capacitor 36. The carry out terminal is also connected through a resistor 37, to the base of a transistor 38. The emitter-collector circuit of the transistor 38 is connected in series with a resistor 39, and this series circuit is connected in parallel with a resistor 40. The latter resistor is connected in series with another resistor 41 and a capacitor 42 between the positive power supply terminal and ground to form an RC circuit that determines the oscillating frequency of an indicator signal generator 43 identified as IC4.

In this embodiment the indicator signal generator 43 is a pulse generator that produces pulses having a repetition rate in the audio frequency range. The pulse output terminal of the pulse generator 11 is connected to the reset, or control, input terminal of the indicator signal generator 43 to cause the latter to generate a burst of audio frequency pulses for the duration of each pulse produced by the pulse generator 11.

The output of the generator 43 is connected to an indicator 44 which, is this embodiment, is a loudspeaker 46. The connecting linkage between the indicator signal generator 43 and the speaker 46 includes a resistor 47 in series with a diode 48 polarized to be conductive only when the output signal of the generator 43 is positive with respect to the voltage across the speaker 46.

The output of the counter 22 is also connected to terminals 51 and 53 of section 56 of the five position switch 20. The terminals 50, 52, and 54 of this switch section are connected to the positive power supply terminal, and the arm 57 of the section 56 is connected to the astable enable, or control, input terminal of the pulse generator 11.

The arm 57 is also connected to the base of a transistor 58, the collector of which is connected to the reset, or control, input terminal of a second pulse generator 59 constructed as an integrated circuit IC5. In the particular IC used as the pulse generator 59, the repetition rate of the pulses is controlled by resistors 61 and 62 and a capacitor 63, and the duty cycle of these pulses is controlled by the resistors 61 and 62.

The output terminal of the pulse generator 59 is connected by a low-pass RC circuit 65 including a resistor 65a and a capacitor 65b to the clock input terminal of a second presettable counter 64 constructed as an integrated circuit IC6 and to the reset input terminal of a second indicator signal generator 66. The latter is constructed as an integrated circuit and is similar to the indicator signal generator 43 except that it has a fixed frequency determined by a series circuit comprising resistors 67 and 68 and capacitor 69. In this embodiment the integrated circuit for the signal generator 43 is actually half of IC4. The output terminal of the signal generator 66 is connected to the indicator 44. As in the case of the signal generator 43, the signal generator 66 is connected to the indicator by a series circuit comprising a resistor 71 and a diode 72 polarized to conduct current when the output terminal of the signal generator 66 is positive with respect to the voltage across the speaker 46. The diodes 48 and 72 thus isolate the signal generator 43 and 66 from each other.

The output terminal of the presettable counter 64 is connected to the input terminal of a second one-shot multivibrator 73, the active elements of which are two NOR gates of the 4-NOR gate integrated circuit IC3. The duration of pulses produced by the one-shot 73 are controlled by an RC circuit comprising a resistor 74 and a capacitor 75. The output terminal of the one-shot 73 is connected back to the preset enable terminal of the counter 64 and to two of the terminals 77 and 79 of the five terminals 76-80 of another section 81 of the switch 20. The arm 82 of this switch section is connected to the preset enable terminal of the presettable counter 22, and the other terminals 76, 78, and 80 of the switch section 81 are connected to the output terminal of the one-shot multivibrator 34.

The operation of the circuit in FIG. 1 will be described in conjunction with the waveform digrams shown in FIGS. 2A-2D and 3A-3D.

The five positions of all of the arms 21, 26, 57, and 82 of the switch 20 correspond to: (A) two rescuers, adult victim; (B) one rescuer, adult victim; (C) two rescuers, child victim; (D) one rescuer, child victim; and (E) one rescuer, infant victim, respectively.

When two rescuers are trying to revive an adult victim, one rescuer can apply chest compression at an even rate and the other rescuer can inflate, or ventilate, the victim's lungs at an even rate which is a submultiple of the compression rate. The compression rate should be sufficiently fast to cause the victim's blood to be pumped thorughout the victim's cardiovascular system at a systolic pressure that will carry adequate oxygen from the victim's lungs to his or her brain. At the present time, it is considered that 60 compressions per minute is the proper rate, and the resistance of the resistor 13 and the capacitance of the capacitor 12 are chosen to produce this rate.

FIG. 2A shows the output waveform of the pulse generator 11 for any setting of the switch 20, the primary difference between different settings of the switch 20 being that the repetition rate of pulses 84 that make up this waveform may be different.

The output pulses 84 are taken from the "Q" terminal of the IC1 pulse generator 11 and are applied to the reset terminal of the signal generator 43, which is another pulse generator. As incidated in FIG. 2D, the pulse generator 43 happens to be so arranged that it can produce bursts 86 and 87 of output pulses only when the voltage at the output terminals of the pulse generator 11 is high.

The repetition rate of the pulses in each burst 86 is higher than that of the pulses in each burst 87, although the drawing is not to be understood as indicating the exact relationship between the repetition rates of any of the pulses. The reason that the repetition rate of the pulses in the bursts 86 is higher than that of the pulses in the bursts 87 is that the transistor 38 is conductive when the bursts 86 are being generated. When the transistor 38 is non-conductive, the repetition rate of pulses produced by the signal generator 43 is determined primarily by the resistance of the two resistors 40 and 41 and the capacitance of the capacitor 42. These components may be selected so that the repetition rate will correspond to any desired audio frequency; a repetition rate of about 500 pulses per second has been found to be satisfactory. This is the frequency during each burst 87.

When the transistor 38 is conductive, its emitter-collector impedance is very low so that the resistor 39 is practically in parallel with the resistor 40, thereby reducing the effective resistance of this part of the circuit. This changes the pulse repetition rate of the signal generator 43 to signal the rescuers that it is time for a compression of the victim. A satisfactory repetition rate for this purpose has been found to be about 1000 pulses per second, which is sufficiently different from the frequency produced when the transistor 38 is not conductive to make it easy for the rescuers to determine which of the pulse bursts are for timing chest compressions and which are for lung ventilation. It does not matter which frequency is higher.

The arrangement of the presettable counter 22 is such that the voltage level 88 at its terminal, as shown in FIG. 2B, has a high value while pulses from the pulse generator 11 are being counted and until the counter counts down to 0 from its preset value determined by the setting of the arm 26 of the switch section 27. When the arm 26 is in contact with any one of the terminals 28, 30, or 32, the transistor 23 will be conductive, causing the counter 22 to be preset to count four pulses 84a-84d from the pulse generator 11, as shown in FIG. 2A. The voltage level at the output terminal of the counter 22 drops to 0, as indicated by reference numeral 89, at the beginning of the fifth pulse 84e.

During the time that the output voltage of the counter has the high value 88, the transistor 38 is conductive and the repetition rate of the pulses 86 produced by the signal generator 43 has a relatively high value, such as the previously mentioned 1000 pulses per second. During the fifth pulse 84e from the pulse generator 11, the low voltage level 89 at the output of the counter 22 causes the transistor 38 to be non-conductive and thus reduces the repetition rate of pulses produced by the signal generator 43 to the previously mentioned lower value of about 500 pulses per second.

At the occurrence of the next pulse 84a', the count no longer corresponds to 0 and so the voltage level at the output terminal of this counter returns to the high level 88'. The positive-going change of voltage from the level 89 back to the level 88 actuates the one-shot multivibrator 34 and causes it to produce a short pulse 91 shown in FIG. 2C. This pulse has a duration of about 100 microseconds and is applied through any of the terminals 76, 78, or 80 of the switch section 81 and through the arm 82 of that section back to the preset enable terminal of the counter 22 to cause the counter to return to its original preset value and begin a new count down.

The reason that the pulse generator 11 can continue to run continuously, whatever the value of the count in the counter 22 may be, is that, when the arm 82 of the switch section 81 is set to any of the three terminals 76, 78, or 80, the arm 57 of the switch section 56 is set to one of the terminals 50, 52, or 54, all of which are connected directly to the positive power supply terminal of the circuit. This positive voltage is fed back through the arm 57 to the astable enable input terminal of the pulse generator 11 to cause the latter to be free-running.

The pulse bursts 86 and 87 shown in FIG. 2D are applied by the output terminal of the signal generator 43 through the resistor 47 and the diode 48 to the loudspeaker 46, which forms the indicator 44. This causes the speaker to emit a tone, or audible burst, that corresponds in frequency to the repetition rate of the pulses; i.e., the relatively high repetition rate during the occurrence of each of the pulses 86, and the relatively lower repetition rate during the occurrence of the pulses 87.

The operation of the circuit in FIG. 1 by a single rescuer applying CPR to an adult or a child will be described with reference to the waveform diagram in FIGS. 3A–3G.

FIG. 3A shows output pulses 92 of the first pulse generating circuit 11 and is therefore similar to the waveform in FIG. 2A except that the repetition rate of the pulses 92 is usually different from that of the pulses 84. The number of pulses to be counted in a sequence of compression-timing pulses is fifteen, which is also different from the number counted in the case of more than one rescuer. The count is determined by the voltage applied to the base of transistor 23, which is 0 and causes the transistor to be nonconductive. As a result, the terminals $2^1$ and $2^3$ of the counter 22 are at the level of the positive power supply terminal, causing the counter to count fourteen pulses 92a–92n before its output terminal reaches 0 at the start of the fifteenth pulse 92o.

FIG. 1 shows the arms 21, 26, 52, and 79 of the switch 20 set at the position for timing CPR compressions and ventilations for an adult victim being treated by a single rescuer. The 80 pulse-per-second repetition rate of pulses 92 produced by the pulse generator is controlled by the capacitor 12 and the resistor 14. Since this rate is the same as the rate for a child being worked on by the rescuers, the resistance of resistor 14 is the same as that of the resistor 15 and it would be possible to eliminate one of these resistors and simply connect together the two terminals to which they are connected and which are contacted by the switch arm 21.

When the counter 22 is counting down, its output voltage is at the logical high level indicated by reference numeral 93. It drops to 0 at the start of pulse 92o, as indicated by reference numeral 94. With the arm 57 of the switch 20 in contact with the terminal 51, the voltage applied to the astable enable input terminal of the pulse generator 11 will be 0, so that the pulse generator 11 cannot continue to produce pulses.

However, the drop of voltage to 0 at the terminal 51 causes the transistor 58 to become non-conductive, thereby raising the collector voltage from the low level 96 shown in FIG. 3C to the high level 97 and releasing the pulse generator 59 to begin producing pulses 98a–98d, as shown in FIG. 3D. These pulses have a repetition rate suitable for timing two ventilations simultaneously with pulses 98b and 98c.

The pulses 98a–98d from the pulse generator 59 are counted by the counter 64, which is preset to 0011, the binary equivalent of the decimal number 3. The counter 59 is based on the same IC as the counter 22 but its presetting terminals are connected to different logical values. The output voltage of the counter 64 remains at a high level 99 as shown in FIG. 3E while that counter is quiescent and during the pulses 98a and 98b. It drops to the low level 100 starting at the time of occurrence of the leading edge of the third pulse 98c. The low-pass circuit 60 prevents extraneous, very short pulses from affecting the count.

The voltage level applied to the reset terminal of the pulse generator 59 is not directly affected by the condition of the counter 64 and so the pulse generator 59 begins to generate a fourth pulse 98d. This causes the counter 64 to shift away from a count of 0 and, as a result, the value of the output voltage rises from the low level 100 to the high level 99'. This rise in voltage applied to the input terminal of the one-shot multivibrator 73 causes the latter to generate a pulse 101 having a short duration of about 100 microseconds.

The pulse 101 is applied through the terminal 77 and the arm 82 of the switch section 81 to the preset enable terminal of the counter 22. This immediately returns that counter to its preset condition and raises its output voltage to the high level 93', which causes the transistor 58 to become conductive. When this happens, the collector voltage drops to the low level 96' and clamps the pulse generator 59 to its quiescent condition. The output voltage of the pulse generator 59 therefore drops to 0 immediately after the leading edge of the pulse 98d, making the duration of that pulse very sort.

Because the pulse 101 returns the counter 22 to its preset value during the pulse 92a', pulse 92a' does not get counted. The counting of fourteen pulses starts with the pulse 92b' and therefore the pulse 92o' is really the fourteenth counted pulse. This means that the first group of pulses 92 is actually one pulse short of the desired fifteen pulses.

That is why the counter has to be preset for fourteen pulses, one less than the desired fifteen. The same loss of one pulse is true in the case of the pulses 84a–84e in FIG. 2A, making it necessary to set the counter 22 to count four instead of the desired five pulses; the pulse 84a' is not counted.

FIG. 3G shows the composite signal applied to the speaker 46. During the pulses 92a–92n, pulse bursts 102a–102n are generated by the signal generator 43. These are identical with the pulses 86 in FIG. 2D and thus have the same frequency of about 1000 pulses per second. This may be referred to as frequency $f_1$.

During the time the pulse 92o exists, the signal generator 43 generates the lower of its two frequencies, 500 pulses per second which may be referred to as frequency $f_2$. During the period of each of the pulses 98a–98c, the signal generator 66 is gated "on" and thus causes the signal generator 66 to generate a signal at still a different frequency $f_3$. A suitable value for frequency $f_3$ has been found to be 625 pulses per second. This frequency, alone, is generated in bursts 103a and 103b and the single rescuer should use these two easily distinguishable bursts to time two exhalations of air into the victim's mouth.

The burst 104 is different from all other bursts. During the first part of that burst, the signal generator 43 is supplying pulses at frequency $f_2$ to the speaker 46 and the signal generator 66 is supplying pulses at the frequency $f_3$. This makes the burst 104 easily distinguishable audibly from the bursts 102 that preceded it and warns the single rescuer that the compression then being applied to the victim is the last one of that sequence.

Each pulse 98 has a longer duration than a pulse 92 and so the pulse 98a continues after the pulse 92o has ended. As a result, the signal generator 43 stops part way through the burst 104, and the last part of that burst is at the frequency $f_3$. This further emphasizes the audible uniqueness of the burst 104.

There is ample time for the single resuer to shift from the compression position to the ventilation position between the end of the pulse 92n and the beginning of the burst 103a. Since there are only two bursts 103a and 103b to time ventilation, the rescuer is not likely to lose count. Thus, it is unnecessary for the first burst 102a' to be audibly different from the following compression-timing bursts 102b', etc.

The following components have been found to provide a satisfactory embodiment:

| IC1 | | : CD4047 |
|---|---|---|
| IC2 | | : CD4029 |
| IC3 | | : CD4001 |
| IC4 | | : μA 556 |
| IC5 | | : μA 455 |
| IC6 | | : CD4029 |
| Transistors | | : 2N3904 |
| Diodes | | : 1N4148 |
| Capacitor | 36 | : 3300pf |
| | 42 | : 3900pf |
| | 63 | : 1.2 μf |
| | 65b | : 120pf |
| | 75 | : 3300pf |
| Resistor | 24 | : 100k |
| | 35 | : 100k |
| | 39 | : 510k |
| | 40 | : 390k |
| | 41 | : 200k |
| | 47 | : 75 ohms |
| | 61 | : 1 meg |
| | 62 | : 1 meg |
| | 65a | : 10K |
| | 67 | : 150K |
| | 69 | : 220k |
| | 71 | : 75 ohms |
| | 74 | : 100k |

While this invention has been described primarily in terms of a specific embodiment, those skilled in the art will recognize that modifications may be made therein within the scope of the following claims.

What is claimed is:

1. A timer comprising:
   first pulse generating means to generate a first series of pulses at a first selectable repetition rate;
   second pulse generating means to generate a second series of pulses at a second repetition rate;
   connection means to connect the first pulse generating means to the second pulse generating means to initiate the operation of the second pulse generating means after a selected number of pulses of the first series; and
   indicator means connected to the first and second pulse generating means to indicate separately the occurrence of pulses in each of the first and second series of pulses.

2. The timer of claim 1 comprising second connection means to connect the second pulse generating means to the first pulse generating means to initiate the operation of the first pulse generating means after a selected number of pulses of the second series.

3. The timer of claim 1 in which the indicator means comprises audible sound-generating means energized to produce audible impulses in response to each of the pulses of the first series.

4. The timer of claim 3 in which the sound-generating means comprises:
   an oscillator to generate audio frequency oscillations; and
   transducer means connected to the oscillator to be energized by the audio frequency oscillations, the first pulse generating means being connected to cause the audio frequency oscillations from the oscillator to be transferred to the transducer to emit one of the audible impulses as an audible burst.

5. The timer of claim 4 in which the first pulse generating means is connected to the oscillator to gate the oscillator into operation during each pulse of the first series of pulses to generate the audio frequency oscillations in bursts.

6. The timer of claim 4 in which the oscillator comprises controllable frequency-determining means to control the audio frequency, and the timer further comprises means connected to the first pulse generator and to the frequency-determining means to set the frequency of the oscillator at different values selected pulses than during others.

7. The timer of claim 6 comprising:
   a presettable counter connected to the first pulse generator to count a certain number of pulses of the first series, each pulse causing the oscillator to produce one of the bursts for substantially the duration of the respective pulse, the frequency-determining means comprising impedance means and a transistor having an output circuit connected thereto and having an input circuit connected to the first counter to be actuated by selected ones of the pulses generated by the first pulse generator to change the impedance of the output circuit of the transistor to set the audio frequency of the oscillation bursts at one value during each of the selected ones of the first series of pulses and at a different value during other of the first series of pulses.

8. The timer of claim 3 comprising connection means connecting the audible sound-generating means to produce the first-named audible impulses in response to each of the pulses of the first series and to produce audibly different second audible impulses in response to each of the pulses of the second series.

9. The timer of claim 1 in which the first pulse generating means comprises a first pulse generator and the second pulse generating means comprises a second pulse generator.

10. The timer of claim 9 comprising:
    a first audio frequency oscillator connected to the first pulse generator to be controlled thereby; and
    a second audio frequency oscillator connected to the second pulse generator to be controlled thereby.

11. The timer of claim 9 in which the connection means comprises:
    a first pulse counter connected to the first pulse generator to count a selected number of pulses of the first series; and
    a second pulse counter connected to the second pulse generator to count a selected number of pulses of the second series.

* * * * *

UNITED STATES PATENT AND TRADEMARK OFFICE
CERTIFICATE OF CORRECTION

PATENT NO. : 4,193,064
DATED : March 11, 1980
INVENTOR(S) : Michael D. Snyder

It is certified that error appears in the above-identified patent and that said Letters Patent are hereby corrected as shown below:

Column 1, line 21, change "victin" to --victim-- line 38, change "victin" to --victim--

Column 2, line 27, change "it" to --It--

Column 5, line 51, change "incidated" to --indicated--.

Column 10, line 19, following "values" insert --during--.

Signed and Sealed this

Twenty-ninth Day of July 1980

[SEAL]

Attest:

SIDNEY A. DIAMOND

Attesting Officer

Commissioner of Patents and Trademarks